United States Patent [19]
Wiehe

[11] Patent Number: 6,035,198
[45] Date of Patent: Mar. 7, 2000

[54] METHOD AND SYSTEM FOR DETERMINING THE LOCATION OF A MOBILE RADIOCOMMUNICATION SUBSCRIBER REGISTERED IN A CELLULAR MOBILE RADIOTELEPHONE NETWORK

[75] Inventor: Ulrich Wiehe, Bad Hersfeld, Germany

[73] Assignee: Siemens Aktiengesellschaft, Munich, Germany

[21] Appl. No.: 08/922,245

[22] Filed: Sep. 2, 1997

[30] Foreign Application Priority Data

Sep. 2, 1996 [DE] Germany .................. 196 35 581

[51] Int. Cl.[7] .................................................. H04M 11/00
[52] U.S. Cl. .................. 455/445; 455/408; 455/433; 455/456
[58] Field of Search .................. 455/433, 432, 455/406, 408, 440, 445, 456

[56] References Cited

U.S. PATENT DOCUMENTS

| | | | |
|---|---|---|---|
| 5,432,841 | 7/1995 | Rimer | 379/59 |
| 5,467,381 | 11/1995 | Peltonen et al. | 379/58 |
| 5,497,412 | 3/1996 | Lannen et al. | 379/60 |
| 5,506,888 | 4/1996 | Hayes et al. | 379/59 |
| 5,533,026 | 7/1996 | Ahmadi et al. | 370/94.1 |
| 5,619,552 | 4/1997 | Karppanen et al. | 455/433 |
| 5,724,658 | 3/1998 | Hasan | 455/445 |
| 5,796,790 | 8/1998 | Brunner | 455/406 |
| 5,819,180 | 10/1998 | Alperovich et al. | 455/433 |
| 5,832,382 | 11/1998 | Alperovich | 455/433 |

OTHER PUBLICATIONS

European Telecommunications Standards Institute, GSM recommendation 03.79, version 0.9.0 of Jul. 31,1996, 32(2 sided pages), various page numbering.

*Primary Examiner*—Edward F. Urban
*Assistant Examiner*—Thuan T. Nguyen
*Attorney, Agent, or Firm*—Hill & Simpson

[57] ABSTRACT

A lower signaling load and a shorter connection setup time in relation to the known two-stage location request is achieved with an optimal routing in that, upon receiving the message (SRIL) for the location request, the home register (HLRB) itself checks the feasibility of the setup of the direct connection between the gateway mobile switching center (GMSCA) of a first network (IPLMN) and the visited mobile switching center (VMSCB) of another network (VPLMN) for reasons of the charging of the call. Given a positive test result, a modified message, additionally containing a flag (PRN) for the request of a temporary mobile subscriber roaming number (MSRN), is sent to the visitor register (VLRB). The home register can determine the feasibility of the connection setup for charging of the call after the first receipt of a location request, and can immediately (that is, without waiting for a new location request by the gateway mobile switching center) call the mobile subscriber roaming number from the responsible visitor register and send it to the requesting gateway mobile switching center.

19 Claims, 2 Drawing Sheets

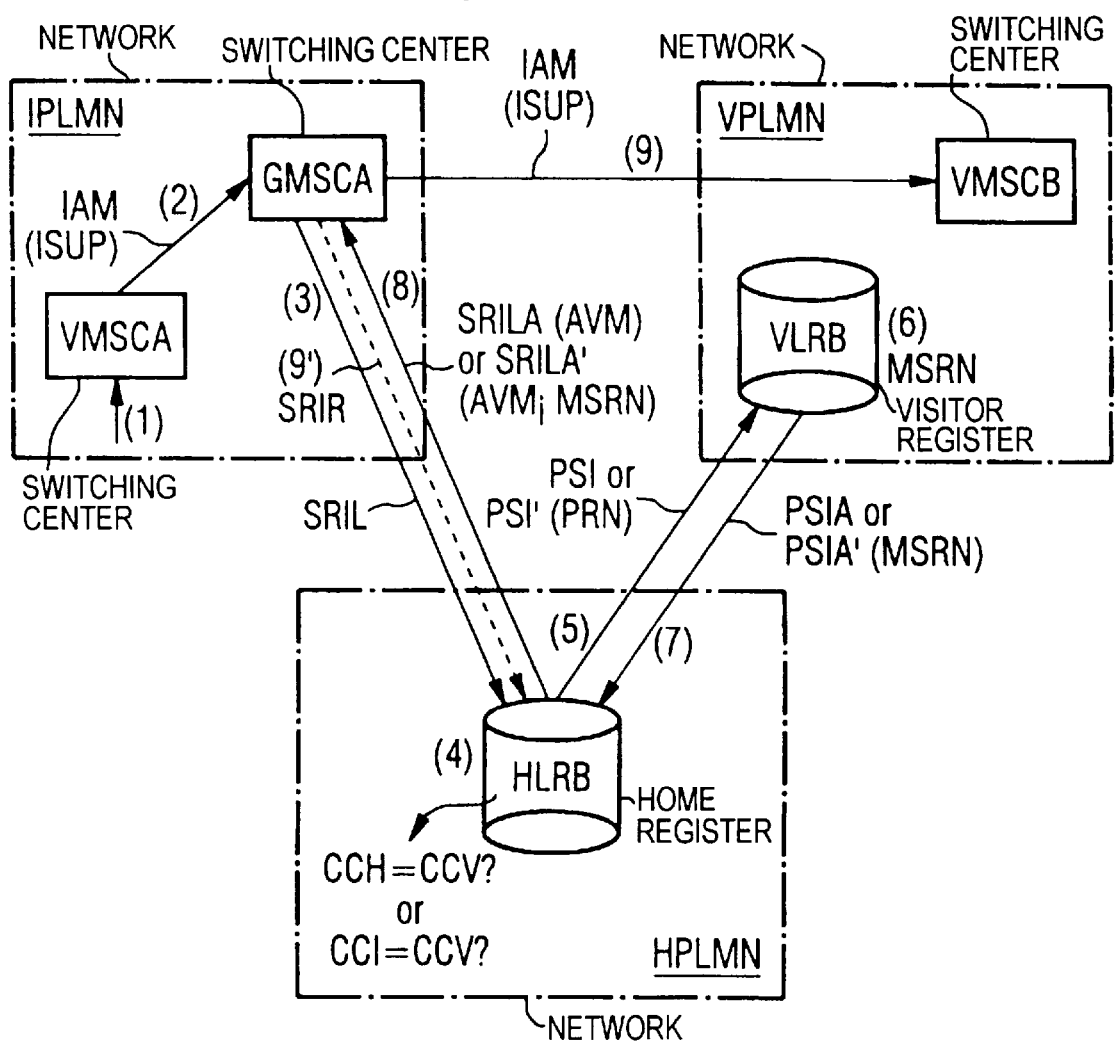

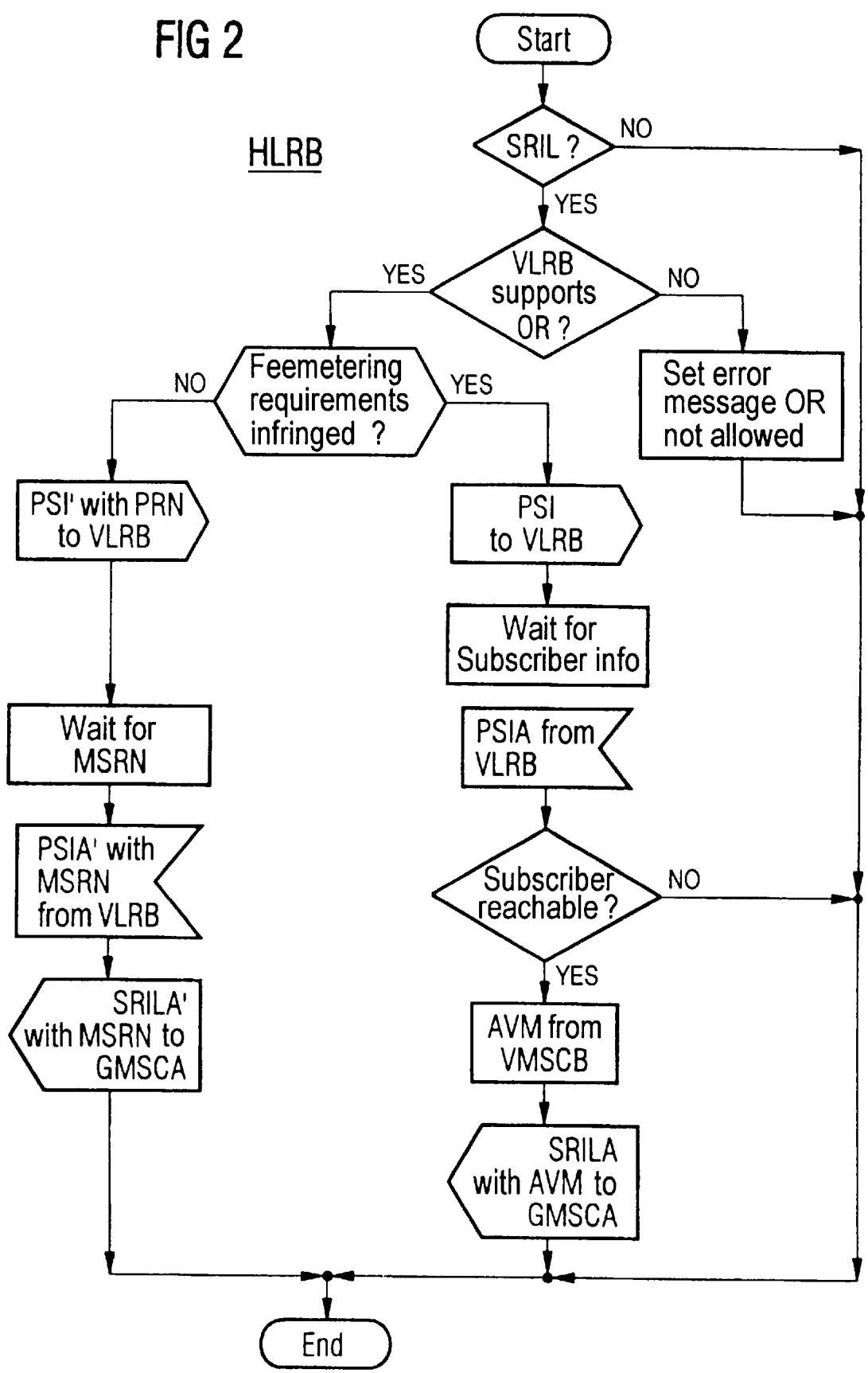

METHOD AND SYSTEM FOR DETERMINING THE LOCATION OF A MOBILE RADIOCOMMUNICATION SUBSCRIBER REGISTERED IN A CELLULAR MOBILE RADIOTELEPHONE NETWORK

BACKGROUND OF THE INVENTION

The present invention relates to a method and a system for determining the location of a mobile subscriber registered in a cellular mobile radiotelephone network for an optimal routing, given an incoming call directed to the mobile subscriber.

A cellular radiotelephone network, such as for example the digital radio communication system defined according to the GSM standard (Global System for Mobile Communication), is constructed from a plurality of radio cells, and offers the mobile subscriber a maximum degree of mobility in the context of radio communication. The international mobile radiotelephone network according to the GSM standard comprises a base station system for setting up, dismantling, and maintaining radio links between mobile subscriber stations and base stations, a switching-oriented system for setting up, managing and clearing down connections, taking into account mobility-specific functions, as well as an operating and maintenance system for monitoring operational states and for controlling the network components arranged in distributed fashion in the mobile radiotelephone network. The tasks of the switching-oriented system include the management of the subscriber data of the mobile subscribers, the discovery of the location of a called mobile subscriber or, respectively, of his mobile subscriber station at any location of the GSM service area, the connection setup and the acquisition of the fee data (charging of a call) for calls going out from or, respectively, coming in to the mobile subscriber. To carry out the tasks, the switching-oriented system is provided with mobile switching centers which in particular take over the mobility-related methods and functions in the setting up and dismantling of connections and in handling connections within the mobile radiotelephone network and at the interfaces to other communication networks, as well as via visitor registers and home registers, of which the visitor register temporarily contains the subscriber data of the mobile subscribers already located in the service area of an allocated mobile switching center, while in the home register the subscriber data of the mobile subscribers are permanently managed.

The subscriber data determine the subscriber profile, that is, the services and authorizations booked by the mobile subscriber. In addition, the home register stores an item of information for the identification of the visitor register in which the mobile subscriber is managed at that moment on the basis of his location. As a rule, this is the address of the visitor register or, respectively, of the mobile switching center, so that the location of the mobile subscriber can be determined by a location query directed to the home register by the mobile switching center. Via the address of the currently responsible visitor register, the home register can request a mobile subscriber roaming number, which is required to enable the setup of a connection from a gateway mobile switching center to a visited mobile switching center.

To support an optimal routing in the GSM mobile radiotelephone network, according to the GSM recommendation 03.79, version 0.9.0 of Jul. 31, 1996, a location query message can be sent across networks by the gateway mobile switching center of a first network to the home register of another network in which the called mobile subscriber is permanently registered with his subscriber data. The purpose of the location query is to provide information on the basis of which a direct connection can be set up to a visited mobile switching center of another network in which the called mobile subscriber is currently registered on the basis of his location.

According to the cited GSM recommendation 03.79, in order to support the optimal routing a two-stage location query is required, in which at first only items of information concerning the location of the called mobile subscriber are requested, e.g. in the form of the address of the responsible visited mobile switching center, by the gateway mobile switching center with a first query (send location info) directed to the home register of the other network. For this purpose, a message concerning the request of items of subscriber information (provide subscriber info) is sent by the home register to the visitor register currently responsible for the mobile subscriber, and as an acknowledgment a message (provide subscriber info acknowledge) is received. The home register thereupon sends an item of information for the identification of the visited mobile switching center back to the gateway mobile switching center in a message (send location info acknowledge) with which the first request is acknowledged.

After this, the gateway mobile switching center checks to see that nothing stands in the way of the setting up of a direct connection to the visited mobile switching center for reasons of charging. The requirements for the charging of the call with support of the optimal routing are described in the GSM recommendation 03.79, on page 24 in chapter 9.1. If the result of the check is positive, a second location query (send routing info) is directed to the home register by the gateway mobile switching center, so that the visitor register can request the mobile subscriber roaming number. The advantage of the two-stage location query, which respectively has to be initiated by the gateway mobile switching center, is that the mobile subscriber roaming number is first requested by the visitor register when, after checking the charging requirements, the use of a mobile subscriber roaming number for the connection setup is ensured, and thus the assignment of mobile subscriber roaming numbers that remain unused due to unfulfilled charging requests is avoided.

SUMMARY OF THE INVENTION

It is an object of the present invention to provide a method and system of the type described above by which the location request can be improved for an optimal routing in relation to signaling load and connection setup time.

A lower signaling load and a shorter connection setup time in relation to the known two-stage location query is achieved in that, upon receipt of the message for the location request, the home register itself checks the feasibility of the setup of the direct connection between the gateway mobile switching center and the visited mobile switching center. If the result of the check is positive, the home register sends a modified message to the visitor register. The message additionally contains a flag for the request of a temporary mobile subscriber roaming number. After the first receipt of a location request the home register can already carry out the feasibility of the connection setup for charging of the call, and can immediately (that is, without waiting for a new location request according to the described known method) request the mobile subscriber roaming number from the responsible visitor register and send it to the requesting gateway mobile switching center. The advantage of the known solution, that is, of the assurance that only truly necessary temporary mobile subscriber roaming numbers are assigned and occupied, is maintained in the inventive method. The additional advantages of the invention are a lower signaling load, due to the omission of several signaling messages that are required in the two-stage location request between the components for the support of the optimal routing, as well as a faster connection setup in the case of a direct connection between mobile switching centers of a first and second networks.

According to a development of the present invention, the message provided for the request of subscriber information is checked by the visitor register for the presence of the flag. If the result of the check is positive, a mobile subscriber roaming number is assigned, which is additionally sent back to the home register in a message with which the request is acknowledged. Preferably, the checking of the message for the request of the subscriber information is carried out by the visitor register only for the case in which the mobile subscriber can be reached.

According to another development of the invention, a message is sent back to the gateway mobile switching center by the home register, in which the location request is acknowledged and, in addition, the mobile subscriber roaming number assigned by the visitor register upon request is transmitted.

It is advantageous if the incoming message is checked by the gateway mobile switching center for the presence of a mobile subscriber roaming number, so that, given a positive check result, the direct connection to the visited mobile switching center is set up on the basis of the mobile subscriber roaming number, or, given a negative check result, a second location request message is sent to the home register. The known method and the new and inventive method can thus exist side by side and independently of one another. For the case in which a temporary mobile subscriber roaming number has already been transmitted by the home register after the first location request, the second location request according to the two-stage known method is skipped, and the direct connection for the optimal routing can already be immediately set up early, on the basis of the already-present temporary mobile subscriber roaming number.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a schematic diagram of the message flow between the network installations concerned by the location request, for an optimal routing across network boundaries, and FIG. 2 shows a flow diagram of the treatment of the location request by the home register in the home network of the called mobile subscriber.

DESCRIPTION OF THE PREFERRED EMBODIMENTS

The schematic diagram in FIG. 1 shows the sequence for the determination of the location of a mobile subscriber registered in the cellular mobile radiotelephone network, for the example of the international cellular mobile radiotelephone network according to the GSM standard. An optimal routing is thereby supported for the incoming call directed to the mobile subscriber (mobile terminated call). Assume in the present example that what is concerned is a call initiated by an A mobile subscriber and directed to the B mobile subscriber (mobile-to-mobile call). The A mobile subscriber is thereby located in the service area of a first network IPLMN, while the B mobile subscriber is permanently registered with his subscriber data in another network HPLMN, and is temporarily registered in another network VPLMN on the basis of his location at the moment. For the called B mobile subscriber, the network HPLMN represents his home network (Home PLMN) and the network VPLMN represents his visited network (Visited PLMN). For simplicity, let it also be assumed that the networks IPLMN, HPLMN and VPLMN have an identical network construction according to the international GSM mobile radiotelephone network, but are operated by corresponding network operators in different countries. Thus, assume for example that the A mobile subscriber is calling from a mobile radiotelephone network in Germany and the B mobile subscriber is domiciled in the mobile radiotelephone network in Switzerland, but is registered as a visitor in the mobile radiotelephone network of Austria on the basis of his current location.

The schematic diagram shows a visited mobile switching center VMSCA and a gateway mobile switching center GMSCA in the network IPLMN, a home register HLRB in the network HPLMN, and a visitor register VLRB and a visited mobile switching center VMSCB in the network VPLMN. In the present example, the incoming call directed to the B mobile subscriber is initiated by an A mobile subscriber, located in the service area of the visited mobile switching center VMSCA at the initiation of the call. Of course, it is also possible for the call to be started by a wire-bound A subscriber (e.g. from the public telephone network (PSTN)). Both alternatives have in common that the call is forwarded to the gateway mobile switching center GMSCA, which is arranged in the network IPLMN at the interface to other networks. In addition, the visited mobile switching center VMSCA and the gateway mobile switching center GMSCA can also coincide.

On the basis of the subscriber call number of the B mobile subscriber dialed by the A mobile subscriber (by means of input into a mobile subscriber station), the visited mobile switching center VMSCA receives a message (call setup) for the setup of a signaling connection (1) via the corresponding base station system in the network IPLMN. The visited mobile switching center VMSCA sends a request for the treatment of an outgoing call to a visitor register (not shown), which signals the permission for the setup of the signaling connection to the visited mobile switching center VMSCA. The visited mobile switching center VMSCA thereupon sends a message IAM (Initial Address Message) according to the ISDN user part ISUP, which is used on the connection routes between the mobile switching centers, to the gateway mobile switching center GMSCA (2). For the present case, in which the gateway mobile switching center GMSCA is located in a network other than the home network of the B mobile subscriber, a message SRIL for the location request is sent to the home register HLRB in the home network HPLMN by the gateway mobile switching center GMSCA. This location request (send location info) contains an indication that what is concerned is a request for an item of location information in connection with the optimal routing. The message SRIL is thereby transmitted according to a mobile radiotelephone-specific user part (MAP) (3).

After receiving the message SRIL, the home register HLRB checks whether it is possible to carry out a setup of the direct connection between the gateway mobile switching center GMSCA in the network IPLMN and the visited mobile switching center VMSCP in the other network VPLMN, for charging of the call. This check consists for example of a comparison of country codes allocated to the gateway mobile switching center GMSCA and to the visited mobile switching center VMSCB or, respectively, to the home register HLRB. The charging requests are thereby determined such that higher fees may not be incurred for a call handled according to the optimal routing than for a call guided via the home network of the called mobile subscriber, as in a standard routing. The home register HLRB thus checks a country code CCV associated with the visited mobile switching center VMSCB, with a country code CCH of the home register HLRB and also with a country code CCI of the gateway mobile switching center GMSCA. If at least one comparison yields the identity of the countries, which corresponds to a positive comparison result, the home register HLRB determines that a direct connection setup according to an optimal routing is possible without violating the requirements relating to the charging of the call. On the basis of the country codes, the home register HLRB can determine in a very simple way whether at least two of the three network installations concerned in the location request and in the connection setup are arranged in one and the same country (4).

The comparison of the country codes represents only a simple measure for checking whether the charging of the call presents any obstacle to a direct connection setup. Costlier measures for supporting or refusing the optimal routing for the direct connection of mobile switching centers of different networks can be implemented unproblematically in the home register HLRB, but alternatively can also be relocated to the gateway mobile switching center that starts the location request, without thereby negatively affecting the principle of the determination of the location according to the present invention. In a relocation of more expensive test measures to the gateway mobile switching center, the possibility of simple checking by comparison of country codes in the respective home register can remain.

Due to the fact that the home register HLRB carries out the comparison of country codes itself according to the present invention, in case of a positive comparison result a modified message PSI' can be sent to the visitor register VLRB in the network VPLMN immediately, that is, without waiting for a further location request by the gateway mobile switching center GMSCA. The modified message PSI' (provide subscriber info) standardly serves for the request of items of subscriber information of the B mobile subscriber, and according to the present invention additionally contains a code PRN for the request of a temporary mobile subscriber roaming number MSRN assigned by the visitor register VLRB. By means of the previous checking by the home register HLRB of the feasibility of the setup of a direct connection with respect to the charging of the call, it is guaranteed that the temporary mobile subscriber roaming number is requested immediately after the presence of the positive check result only if it is ensured that it is also required. In this way, an unnecessary assignment of unused temporary mobile subscriber roaming numbers by the visitor register respectively responsible for the called B mobile subscriber is prevented. Before the home register HLRB sends the modified message PSI' with the new flag PRN according to the mobile radiotelephone-specific user part (MAP) to the visitor register VLRB, to be on the safe side it is previously determined whether or not the visitor register VLRB supports an optimal routing. If the comparison result in the home register HLRB does not yield an agreement of country codes, so that, for charging of calls reasons, a direct connection between the mobile switching centers GMSCA and VMSCB is not desired, the home register HLRB sends the standard message PSI (provide subscriber info), with which items of subscriber information are requested, to the visitor register VLRB (5).

In the last case, the visitor register VLRB checks whether the B mobile subscriber can be reached, that is, whether his mobile subscriber station is in a switched-off state, in an occupied state, or the like. The visitor register VLRB checks each message coming in from the home register HLRB requesting items of subscriber information for the presence of the flag PRN, which indicates a modified message PSI' for the request of a temporary mobile subscriber roaming number MSRN. If this is the case, the visitor register VLRB assigns a temporary mobile subscriber roaming number MSRN, which is used for the connection setup between the gateway mobile switching center GMSCA and the visited mobile switching center VMSCB, and is cleared again for further connection setup processes after the termination of the connection setup. The checking of the incoming message PSI or, respectively, PSI' for the presence of the flag PRN is carried out by the visitor register VLRB only when the B mobile subscriber can be reached via his mobile subscriber station, that is, the mobile subscriber station is not in a switched-off state or a state cut off from radiotelephone service (detach status) (6).

If the visitor register VLRB has not been asked for the assignment and transmission of a temporary mobile subscriber roaming number MSRN, it sends a message PSIA to the home register HLRB, in which the state of the B mobile subscriber is communicated. However, if the mobile subscriber roaming number MSRN has been assigned by the visitor register VLRB, it is additionally transmitted to the home register HLRB in a message PSIA' for information about the state of the B mobile subscriber. With the message PSIA or, respectively, PSIA', the request for the items of subscriber information (PSI or, respectively, PSI') by the home register HLRB is acknowledged by the visitor register VLRB.

If the home register HLRB receives, as acknowledgment in the message PSIA, an item of information stating that the B mobile subscriber can be reached, a message SRILA is produced (since no temporary mobile subscriber roaming number MSRN was received) and is sent back to the gateway mobile switching center GMSCA as an acknowledgment for the location request SRIL. An item of information for the identification of the visited mobile switching center VMSCB, which is responsible for the B mobile subscriber, is thereby sent along in the message SRILA. This information preferably consists of the address AVM of the visited mobile switching center VMSCB. If the home register HLRB receives a temporary mobile subscriber roaming number MSRN from the visitor register VLRB, a message SRILA' is produced with which the location request SRIL is acknowledged, and in addition the mobile subscriber roaming number MSRN provided is additionally sent to the gateway mobile switching center GMSCA in addition to the address AVM (8).

In the acknowledgment message sent by the home register HLRB, the gateway mobile switching center GMSCA receives the address of the visited mobile switching center VMSCB at which the connection is to be set up, and also checks whether a temporary mobile subscriber roaming number MSRN is present in the acknowledgment message. If this is the case, then on the basis of the received mobile subscriber roaming number MSRN the direct connection is set up according to the optimal routing between the gateway mobile switching center GMSCA and the visited mobile switching center VMSCB, and the message IAM according to the ISDN user part ISUP is transmitted to the visited mobile switching center (9).

In this way, a direct connection can be set up for the support of an optimal routing between mobile switching centers of different networks, given an incoming call directed to a B mobile subscriber, in which, for the determination of the location of the B mobile subscriber, a signaling load between the network installations that is lower in relation to the known method and a shorter connection setup time in relation to the known method are achieved. The reduction of the signaling load and the shortening of the connection setup time is possible due to the fact that the home register HLRB itself can check the feasibility of the direct connection with respect to the charging requirements. Given a positive check result, a temporary mobile subscriber roaming number can be requested immediately (that is, without waiting for a further location request by the gateway mobile switching center) by the visitor register that is respectively currently responsible for the B mobile subscriber, and can be sent back to the gateway mobile switching center for the connection setup.

For the case in which the gateway mobile switching center GMSCA receives no mobile subscriber roaming number MSRN in the acknowledgment message SRILA, a second location request SRIR (send routing info) can be sent to the home register HLRB, in order to receive, if necessary, a mobile subscriber roaming number MSRN in a second stage. The last-named procedure is preferably used when home registers are used in home networks that are not operated according to the method of the present invention.

FIG. 2 shows a flow diagram for handling the location request for the determination of the location of the B mobile subscriber by the home register HLRB, in which the called B mobile subscriber is permanently stored with his subscriber data. The home register HLRB first checks whether the message SRIL has been received, with which the location request from the gateway mobile switching center of another network comes into the home network across networks. Upon receipt of the message SRIL, the home register HLRB first determines whether the visitor register VLRB currently responsible for the called B mobile subscriber supports in principle a direct connection setup between mobile switching centers of different networks according to an optimal routing OR. If this is not the case, an error message is produced by the home register HLRB, signaling that an optimal routing OR is not allowed.

If the visitor register VLRB being addressed supports an optimal routing OR, the home register checks whether the setup of the direct connection between the gateway mobile switching center and the visited mobile switching center can be carried out for reasons of the charging of the call. The checking ensues in a simple manner by comparison of the country codes of the two mobile switching centers or, respectively, of the country codes of the home register and of the visited mobile switching center. If at least one comparison does not yield identical country codes, the home register HLRB sends the message PSI to the visitor register VLRB in order to call items of subscriber information. During the checking of the subscriber status by the visitor register VLRB, the home register HLRB is in a waiting state that is maintained until the message PSIA is received by the visitor register VLRB, with which the visitor register VLRB signals the state of the B mobile subscriber or, respectively, of his mobile subscriber station. If the called B mobile subscriber is in a state in which he cannot be reached (detach status), for example, due to a switched-off mobile subscriber station or faulty radio coverage, the location request is broken off early. If the B mobile subscriber can be reached, the home register HLRB provides the address AVM the visited mobile switching center VMSCB as routing information or, respectively, a routing address, and sends it back to the gateway mobile switching center GMSCA in the message SILA. With the message SRILA, the location request initiated by the gateway mobile switching center, which can be recognized in the received message SRIL, is acknowledged by the home register HLRB.

If the comparison of the respective country codes by the home register HLRB yields the result that no requirements form an obstacle, for reasons of charging of the call, to a direct connection setup between the two mobile switching centers according to the optimal routing, immediately after the check the home register HLRB sends out the modified message PSI' with an additional flag PRN to the responsible visitor register VLRB. The flag PRN thereby signals the request of a temporary location call number MSRN that is temporarily assigned by the visitor register VLRB on the basis of its responsibility forthe B mobile subscriberfor the connection setup between the A mobile subscriber and the B mobile subscriber. During the allocation of a temporary mobile subscriber roaming number MSRN from a predetermined supply of numbers, the home register HLRB is in a waiting state that terminates with the receipt of the message PSIA'. The message PSIA' serves as an acknowledgment for the previously received message PSI'. The temporary mobile subscriber roaming number MSRN allocated by the visitor register VLRB is thereby sent back to the home register HLRB in the message PSIA' as an additional parameter. The home register HLRB thereupon sends the message SRILA' with the mobile subscriber roaming number MSRN back to the gateway mobile switching center GMSCA, in order to acknowledge the location request that can be recognized in the received message SRIL and to signal to the gateway mobile switching center the supporting of the optimal routing. On the basis of the received mobile subscriber roaming number MSRN, the gateway mobile switching center GMSCA can directly construct a connection setup to the visited mobile switching center VMSCB. The further connection setup via the base station system in the network currently responsible for the B mobile subscriber ensues on the basis of known procedures that are not affected by the present invention. By means of the checking of the feasibility of a direct connection setup between mobile switching centers across network boundaries, and by means of the immediate request of a temporary mobile subscriber roaming number by the respective home register responsible for the called B mobile subscriber in his home network in case of a positive test result, the signaling load can be reduced and the connection setup time can be shortened.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for determining a location of a mobile subscriber registered in a cellular mobile radiotelephone network for an optimal routing given a mobile terminated call directed to the mobile subscriber, comprising the steps of:

sending, based on a subscriber call number of a called mobile subscriber, a message for a location request, across networks, from a gateway mobile switching center of a first network to a home register of a second another network in which the mobile subscriber is permanently registered with subscriber data of the mobile subscriber;

sending a message from the home register for the location request to a visitor register of a further network, in which the mobile subscriber is currently registered based on a current location of the mobile subscriber;

allocating a visited mobile switching center to the visitor register;

determining for optimal routing, if a direct connection is established between the gateway mobile switching center and the visited mobile switching center with respect to charging of the call;

checking, upon receipt of the location request message from the home register, feasibility of a setup of the direct connection and providing a test result indicative thereof;

sending if the test result is positive indicating that a direct route is establishable, a modified message, additionally containing a flag for a request of a temporary mobile subscriber roaming number, to the visitor register.

2. The method according to claim 1, wherein the message for the request of the location is checked by the visitor register for the flag, and, if the flag is present mobile subscriber roaming number is assigned, which is additionally transmitted to the home register in a message with which the request is acknowledged.

3. The method according to claim 2, wherein the checking of the location request message is carried out by the visitor register only when the mobile subscriber can be reached.

4. The method according to one of claim 1, wherein a message is sent back to the gateway mobile switching center by the home register with which the location request is acknowledged, and wherein at least one item of information is transmitted for identification of the visited mobile switching center.

5. The method according to claim 4, wherein the incoming message is checked by the gateway mobile switching center for the mobile subscriber roaming number, and wherein, if the mobile subscriber roaming number is present, the direct connection to the visited mobile switching center is set up, or, if the mobile subscriber roaming number is not present, a second location request message is sent to the home register.

6. The method according to claim 1, wherein a message is sent back to the gateway mobile switching center by the home register, with which the location request is acknowledged and at least the mobile subscriber roaming number assigned by the visitor register upon request is transmitted.

7. The method according to claim 6, wherein the incoming message is checked by the gateway mobile switching center for the mobile subscriber roaming number, and wherein, if the mobile subscriber roaming number is present, the direct connection to the visited mobile switching center is set up, or, if the mobile subscriber roaming number is not present, a second location request message is sent to the home register.

8. The method according to claim 1, wherein feasibility of the setup of the direct connection is checked by the home register by comparison of country codes that are allocatable to the gateway mobile switching center, the visited mobile switching center and the home register.

9. The method according to claim 8, wherein the country code of the gateway mobile switching center is compared with the country code of the visited mobile switching center, and wherein, given identity of the two country codes, the temporary mobile subscriber roaming number is requested by the home register in the modified message.

10. The method according to claim 8, wherein the country code of the home register is compared with the country code of the visited mobile switching center, and wherein, given identity of the two country codes, the temporary mobile subscriber roaming number is requested by the home register in the modified message.

11. A system for determining a location of a mobile subscriber registered in a cellular radiotelephone network for an optimal routing of a mobile terminated call directed to the mobile subscriber, comprising:

a gateway mobile switching center of a first network, from which, based on a subscriber call number of a called mobile subscriber, a location request message is sent across networks to a home register of a second network in which the mobile subscriber is permanently registered with subscriber data of the mobile subscriber;

means in the home register for sending out a location request message to a visitor register of a further network in which the mobile subscriber is currently registered based on a current location of the mobile subscriber;

a visited mobile switching center allocated to the visitor register;

means for supporting optimal routing, which determines if a direct connection is establishable between the gateway mobile switching center and the visitor mobile switching center with respect to charging of the call;

the home register having a system that, upon receipt of the location request message, checks feasibility of a setup of the direct connection, and, if the direct connection is feasible, provides a modified message for sending to the visitor register, the modified message having a flag for the request of a temporary mobile subscriber roaming number.

12. A method for determining a location of a mobile subscriber registered in a cellular mobile radiotelephone network for an optimal routing given a mobile terminated call directed to the mobile subscriber, comprising the steps of:

sending, based on a subscriber call number of a called mobile subscriber, a message for a location request, across networks, from a gateway mobile switching center of a first network to a home register of a second another network in which the mobile subscriber is permanently registered with subscriber data of the mobile subscriber;

sending a message from the home register for the location request to a visitor register of a further network, in which the mobile subscriber is currently registered based on a current location of the mobile subscriber;

allocating a visited mobile switching center to the visitor register;

determining for optimal routing, if a direct connection is established between the gateway mobile switching center and the visited mobile switching center with respect to charging of the call;

checking, upon receipt of the location request message from the home register, feasibility of a setup of the direct connection and providing a test result indicative thereof, the feasibility of the setup of the direct connection being checked by the home register by comparison of country codes that are allocatable to the gateway mobile switching center, the visited mobile switching center and the home register;

sending if the test result is positive indicating that a direct route is establishable, a modified message, additionally containing a flag for a request of a temporary mobile subscriber roaming number, to the visitor register.

13. The method according to claim 12, wherein the country code of the gateway mobile switching center is compared with the country code of the visited mobile switching center, and wherein, given identity of the two country codes, the temporary mobile subscriber roaming number is requested by the home register in the modified message.

14. The method according to claim 12, wherein the country code of the home register is compared with the country code of the visited mobile switching center, and wherein, given identity of the two country codes, the temporary mobile subscriber roaming number is requested by the home register in the modified message.

15. The method according to claim 12, wherein the message for the request of the location is checked by the visitor register for the flag, and, if the flag is present mobile subscriber roaming number is assigned, which is additionally transmitted to the home register in a message with which the request is acknowledged.

16. The method according to claim 15, wherein the checking of the location request message is carried out by the visitor register only when the mobile subscriber can be reached.

17. The method according to one of claims 12, wherein a message is sent back to the gateway mobile switching center by the home register with which the location request is acknowledged, and wherein at least one item of information is transmitted for identification of the visited mobile switching center.

18. The method according to claim 12, wherein a message is sent back to the gateway mobile switching center by the home register, with which the location request is acknowledged and at least the mobile subscriber roaming number assigned by the visitor register upon request is transmitted.

19. The method according to claim 18, wherein the incoming message is checked by the gateway mobile switching center for the mobile subscriber roaming number, and wherein, if the mobile subscriber roaming number is present, the direct connection to the visited mobile switching center is set up, or, if the mobile subscriber roaming number is not present, a second location request message is sent to the home register.

* * * * *